(12) United States Patent
Fujimura et al.

(10) Patent No.: US 11,733,467 B2
(45) Date of Patent: Aug. 22, 2023

(54) OPTICAL MODULE AND METHOD OF PRODUCING THE SAME

(71) Applicant: Sumitomo Electric Industries, Ltd., Osaka (JP)

(72) Inventors: Yasushi Fujimura, Osaka (JP); Tomoya Saeki, Osaka (JP); Munetaka Kurokawa, Osaka (JP); Masato Furukawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/366,632

(22) Filed: Jul. 2, 2021

(65) Prior Publication Data
US 2022/0011528 A1 Jan. 13, 2022

(30) Foreign Application Priority Data
Jul. 8, 2020 (JP) .................................. 2020-117786

(51) Int. Cl.
*G02B 6/42* (2006.01)

(52) U.S. Cl.
CPC ......... *G02B 6/4212* (2013.01); *G02B 6/4239* (2013.01); *G02B 6/4244* (2013.01)

(58) Field of Classification Search
None
See application file for complete search history.

(56) References Cited

U.S. PATENT DOCUMENTS

| | | | | |
|---|---|---|---|---|
| 5,778,127 A * | 7/1998 | Gilliland | .............. | G02B 6/4204 385/92 |
| 6,595,699 B1 * | 7/2003 | Nguyen | ............... | G02B 6/4231 385/88 |
| 8,171,625 B1 * | 5/2012 | Veitch | .................. | G02B 6/4244 29/840 |
| 2002/0118924 A1 * | 8/2002 | Murata | ................ | G02B 6/4257 385/52 |
| 2002/0171923 A1 * | 11/2002 | Sasaki | .................. | G02B 6/4204 359/362 |
| 2003/0179463 A1 * | 9/2003 | Fernier | ................ | G02B 6/4201 385/39 |

(Continued)

FOREIGN PATENT DOCUMENTS

JP 10-153724 A 6/1998

*Primary Examiner* — Jerry Rahll
(74) *Attorney, Agent, or Firm* — McCarter & English, LLP; Michael A. Sartori

(57) ABSTRACT

An optical module includes a base plate, a carrier, an optical semiconductor device, an optical lens component, and a transmissive resin member in a cured state disposed between the optical semiconductor device and the optical lens component. The optical semiconductor device has an optical end surface, and emits an outgoing beam from the optical end surface or receives an incoming beam at the optical end surface. The optical lens component has a first lens surface and a second lens surface, the first lens surface facing the optical end surface of the optical semiconductor device, the first lens surface being provided between the optical end surface and the second lens surface. The transmissive resin contains either an optical path of the outgoing beam or an optical path of the incoming beam between the optical end surface of the optical semiconductor device and the first lens surface of the optical lens component.

17 Claims, 9 Drawing Sheets

(56) References Cited

U.S. PATENT DOCUMENTS

| | | | | |
|---|---|---|---|---|
| 2004/0178462 A1* | 9/2004 | Sakaguchi | ............ | G02B 6/4238 257/432 |
| 2004/0218858 A1* | 11/2004 | Guy | .................... | G02B 6/4206 385/33 |
| 2005/0053334 A1* | 3/2005 | Miao | .................... | G02B 6/4212 385/88 |
| 2008/0095497 A1* | 4/2008 | Luo | ....................... | G02B 6/4204 385/35 |
| 2015/0036984 A1* | 2/2015 | Wang | ..................... | G02B 6/423 385/88 |
| 2015/0098127 A1* | 4/2015 | Kurokawa | ............. | H04B 10/50 359/484.03 |
| 2017/0227722 A1* | 8/2017 | Shirasaki | ............. | G02B 6/4266 |

* cited by examiner

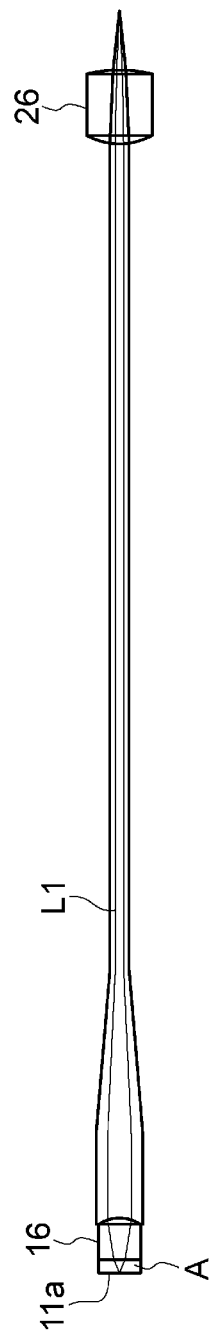
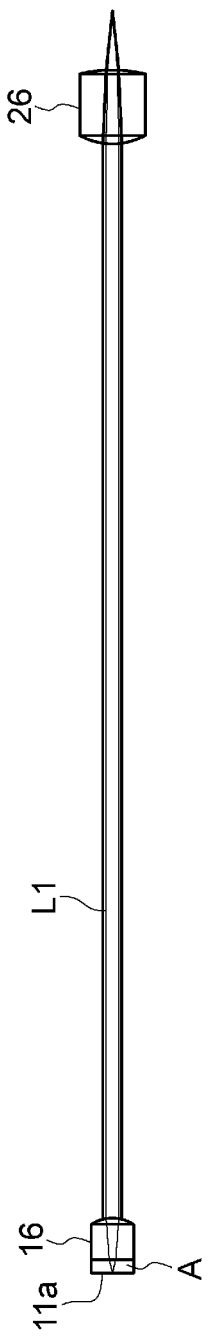
FIG.8A
FIG.8B

OPTICAL MODULE AND METHOD OF PRODUCING THE SAME

CROSS REFERENCES TO RELATED APPLICATION

This application claims priority from Japanese Patent Application No. 2020-117786, filed on Jul. 8, 2020, the entire subject matter of which is incorporated herein by reference.

BACKGROUND OF THE INVENTION

1. Field of the Invention

The present disclosure relates to an optical module and a method of producing the optical module.

2. Description of the Related Art

Japanese Unexamined Patent Application Publication No. 10-153724 discloses an optical module that optically couples a semiconductor laser to an optical fiber using a first lens facing the semiconductor laser and a second lens facing the optical fiber.

SUMMARY

The present disclosure provides an optical module. The optical module includes: a base plate; a carrier mounted on the base plate; an optical semiconductor device having an optical end surface and being mounted on the carrier, the optical semiconductor device being configured to emit an outgoing beam from the optical end surface or receive an incoming beam at the optical end surface; an optical lens component mounted on the base plate, the optical lens component having a first lens surface and a second lens surface, the first lens surface facing the optical end surface of the optical semiconductor device, the first lens surface being provided between the optical end surface and the second lens surface; and a transmissive resin member in a cured state, the transmissive resin member being filled between the optical semiconductor device and the first lens surface of the optical lens component. The transmissive resin member contains either an optical path of the outgoing beam or an optical path of the incoming beam between the optical end surface of the optical semiconductor device and the first lens surface of the optical lens component.

The present disclosure provides a method of producing an optical module including a base plate; a carrier; an optical semiconductor device having an optical end surface and being configured to emit an outgoing beam from the optical end surface or receive an incoming beam at the optical end surface; and an optical lens component having a first lens surface and a second lens surface, the first lens surface being provided between the optical semiconductor device and the second lens surface. The method of producing the optical module includes: positioning the optical semiconductor device and the optical lens component so that an optical end surface of the optical semiconductor device disposed on the base plate with the carrier interposed between the optical semiconductor device and the base plate faces the first lens surface of the optical lens component; aligning the optical lens component so that the outgoing beam becomes collimated light, or an optical coupling efficiency of the outgoing beam reaches a maximum value or a predetermined value, or an optical coupling efficiency of the incoming beam reaches a maximum value or a predetermined value; offsetting the optical lens component from a position where the aligning is performed to separate the optical lens component from the optical semiconductor device along either an optical axis of the outgoing beam or an optical axis of the incoming beam; filling a gel-like transmissive resin between the optical lens component on which the offsetting has been performed and the optical semiconductor device, the gel-like transmissive resin allowing at least one of light curing and thermal curing; and curing the gel-like transmissive resin filled between the optical lens component and the optical semiconductor device by performing at least one of the light curing and the thermal curing on the transmissive resin. In the filling, the gel-like transmissive resin is filled so that when the gel-like transmissive resin is cured, the transmissive resin contains either an optical path of the outgoing beam or an optical path of the incoming beam between the optical end surface of the optical semiconductor device and the first lens surface of the optical lens component.

BRIEF DESCRIPTION OF THE DRAWINGS

FIG. 8A is a view when the optical path of a beam in the optical module including the optical coupling system illustrated in FIG. 6A is seen as a vertical section.

FIG. 8B is a view when the optical path in the optical module including the optical coupling system illustrated in FIG. 6A is seen as a horizontal section.

DETAILED DESCRIPTION

Details of the Embodiment of the Present Disclosure

Specific examples of an optical module according to an embodiment of the present disclosure will be described below with reference to the drawings. Note that the present disclosure is not limited to these examples, and it is intended to include all changes within the meaning and range equivalent to the scope of the claims, defined by the scope of the claims. In the following description, the same components are labeled with the same symbol in the description of the drawings, and a repeated description is omitted.

Figure 1:
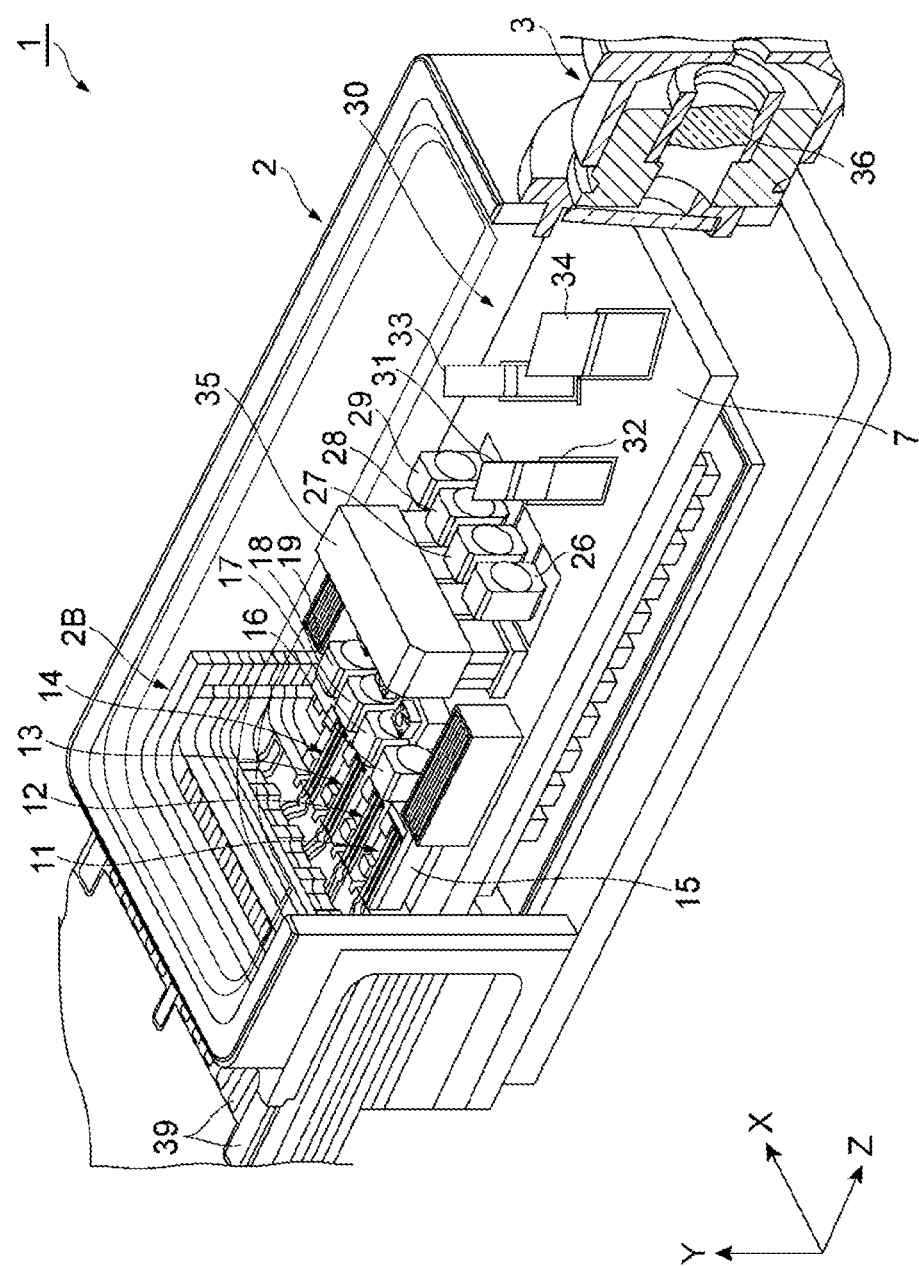
FIG. 1 is a perspective view illustrating the internal structure of an optical module according to an embodiment.
Figure 2:
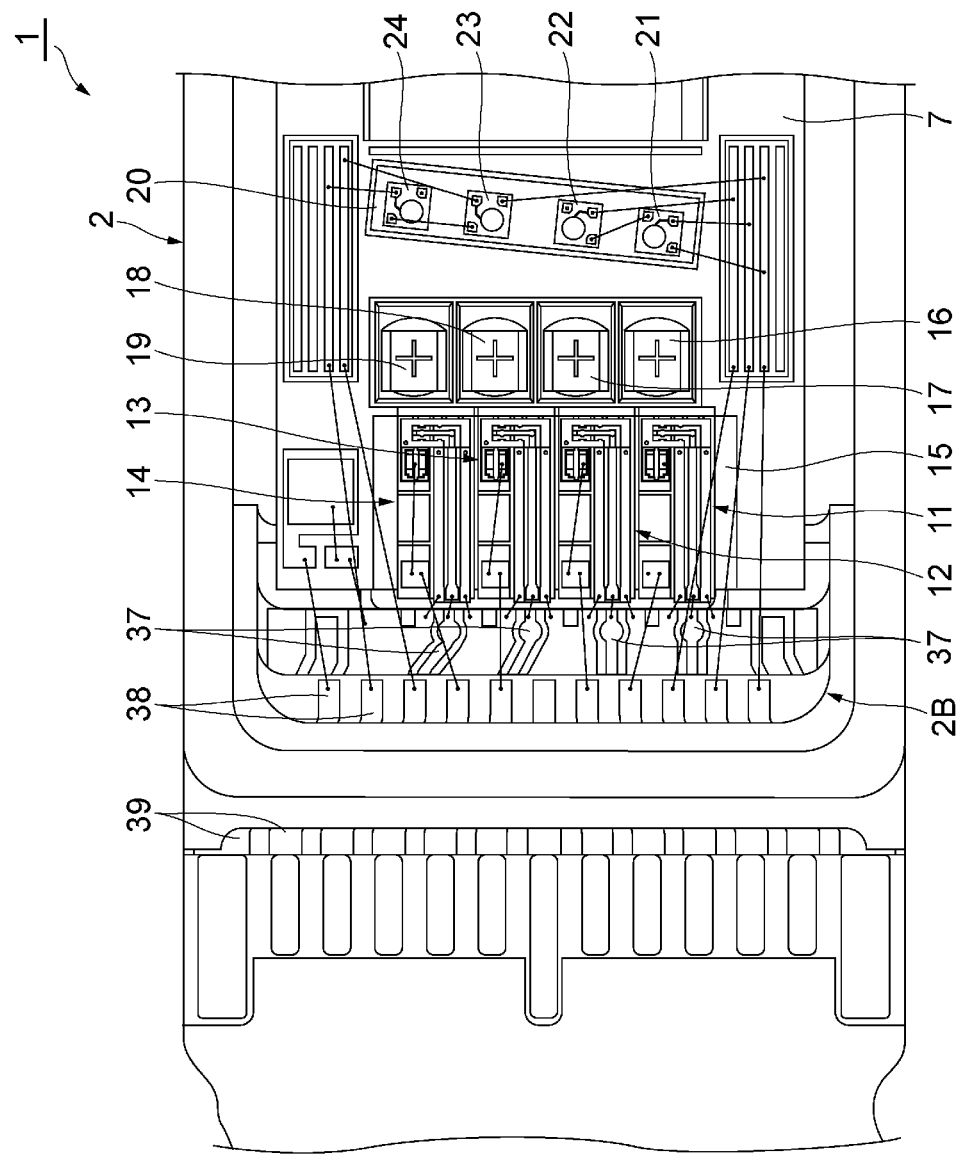
FIG. 2 is an enlarged plan view illustrating part of FIG. 1.

FIG. 1 is a perspective view illustrating the internal structure of an optical module 1 according to an embodiment. FIG. 2 is an enlarged plan view illustrating part of FIG. 1. The optical module 1 is a transmitter optical sub-assembly (TOSA) including a rectangular parallelepiped housing 2 and a cylindrical optical receptacle 3, for example. The optical receptacle 3 has a flange, for example. The optical module 1 includes, for example, N light emitting devices 11 to 14 (N is an integer greater than or equal to 2), a carrier 15, N first lens components 16 to 19, a carrier 20, N light receiving devices (photodiodes, PDs) 21 to 24, N second lens components 26 to 29, and an optical multiplexer 30 in the housing 2. In an example, the optical module 1 is a four-channel (N=4) transmitter optical sub-assembly. The N light emitting devices 11 to 14, the first lens components 16 to 19, the carrier 20, the second lens components 26 to 29, the optical multiplexer 30, and an optical component 35 are disposed on a flat principal surface of a base plate 7 provided in the housing 2. Note that the N light emitting devices 11 to 14 are mounted on the carrier 15 disposed on the base plate 7.

In addition, the housing 2 has a feed-through 2B. The feed-through 2B penetrates the rear wall of the housing 2 in the Z-direction. Note that the optical receptacle 3 penetrates the front wall of the housing 2 in the Z-direction. For example, the feed-through 2B is provided on the opposite side of the housing 2 from the optical receptacle 3. The outside area of the housing 2 for the feed-through 2B is provided with a plurality of terminals 39 for electrical connection to an external apparatus side by side in the X-direction intersecting the Z-direction. The inside area of the housing 2 for the feed-through 2B is provided with a plurality of terminals 38, and N signal lines 37 which form coplanar lines. The N signal lines 37 and the plurality of terminals 38 are electrically connected to respective corresponding terminals 39. The Z-direction is the longitudinal direction of the housing 2, for example.

In the optical module 1, the N light emitting devices 11 to 14 serving as light sources are each driven independently. The N light emitting devices 11 to 14 each output a signal beam individually. Drive signals to drive the N light emitting devices 11 to 14 are provided from the outside of the optical module 1 through the feed-through 2B, for example. As a signal beam, each of the N light emitting devices 11 to 14 outputs light which is modulated according to a drive signal received by the light emitting device. The N light emitting devices 11 to 14 are each an optical semiconductor device, such as an optical modulator chip including a semiconductor laser, for example, and each have a modulator which forms an optical waveguide. The light emitting devices 11 to 14 are each an electro-absorption modulator integrated laser diode (EML), for example. Note that the N light emitting devices 11 to 14 may include no optical modulator, and a signal beam may be generated by directly modulating the intensity of light by a drive signal, the light being emitted from a semiconductor laser. For example, when the optical module 1 is a four-channel optical transmission module, N signal beams output from the N light emitting devices 11 to 14 have central wavelengths (peak wavelengths) which are different from each other. The first lens components 16 to 19 are optically coupled to the N light emitting devices 11 to 14, respectively, in one-to-one correspondence. The signal beams output from the N light emitting devices 11 to 14 are input to the first lens components 16 to 19, respectively.

The carrier 20 is a rectangular parallelepiped member which extends in a direction intersecting the optical axes of signal beams. The carrier 20 is disposed between the position of the first lens components 16 to 19 and the position of the second lens components 26 to 29 in the Z-direction. The carrier 20 internally has a dielectric multilayer (beam splitter) which is oblique to the optical axes of signal beams, and upon transmission of a signal beam through the dielectric multilayer, part of the signal beam is branched. The direction of the optical axis of the signal beam is the Z-direction, for example. Note that the direction of the optical axis of the signal beam may vary depending on the precision of mounting of the N light emitting devices 11 to 14 on the carrier 15, and may not strictly match the Z-direction.

The PDs 21 to 24 are mounted on the principal surface of one carrier 20. The PDs 21 to 24 each receive part of the signal beam branched by the dielectric multilayer, thereby detecting the optical intensity of the signal beam. The backsides of the PDs 21 to 24 are mounted on the principal surface of the carrier 20. The backsides of the PDs 21 to 24 each receive part of the signal beam branched by the dielectric multilayer. The PDs 21 to 24 are each a backside incident photodiode, for example. Detection signals (photocurrents) generated by the PDs 21 to 24 are used to monitor the optical intensity of a signal beam, for example. The second lens components 26 to 29 are disposed so as to interpose the carrier 20 with the first lens components 16 to 19 in the Z-direction. The second lens components 26 to 29 are optically coupled to the first lens components 16 to 19, respectively, in one-to-one correspondence. The signal beams output from the first lens components 16 to 19 pass through the carrier 20, and each form a beam waist, then enter the optical component 35 while spreading again. The optical component 35 allows the signal beam passing through the carrier 20 to transmit, and blocks the return light from the second lens components 26 to 29. Here, the blocking refers to attenuating the return light to a certain level so that, for example, even when the return light enters the semiconductor laser in the light emitting devices 11 to 14, an oscillation operation is not affected. The return light may occur due to a reflection point of the lens surfaces of the second lens components 26 to 29, or due to the later-described optical multiplexer 30. The signal beams passing through the optical component 35 enter the second lens components 26 to 29, respectively. The optical component 35 includes an optical isolator, for example. For example, when the optical module 1 is a four-channel transmitter optical sub-assembly, the optical component 35 may be configured to include four optical isolators which block the return light coming from the second lens components 26 to 29 to the first lens components 16 to 19.

The optical multiplexer 30 is optically coupled to the second lens components 26 to 29 and combines the signal beams input from the second lens components 26 to 29 together. As illustrated in FIG. 1, the optical multiplexer 30 includes a first filter 31, a second filter 32, a mirror 33, and a polarization combiner 34. The mirror 33 is optically coupled to the second lens components 28 and 29. The light reflecting surface of the mirror 33 is located on the optical axes of the second lens components 28 and 29, and is oblique to the optical axes. The first filter 31 is optically coupled to the second lens component 27. The wavelength selection surface of the first filter 31 is located on the optical axis of the second lens component 27, and is oblique to the optical axis. The first filter 31 allows the signal beam from the second lens component 27 to transmit therethrough, and reflects the signal beam reflected by the mirror 33. Thus, the optical path of the signal beam from the second lens component 29 after being reflected by the wavelength selection surface is aligned with the optical path of the signal beam from the second lens component 27 after transmitting through the wavelength selection surface, and these signal beams are combined together. The light reflecting surface of the mirror 33 reflects the signal beam from the second lens component 29 to the first filter 31. Note that whether the signal beam entering the first filter 31 transmits through the wavelength selection surface or is reflected by the wavelength selection surface is determined according to the wavelength of the signal beam. The respective central wavelengths (peak wavelengths) of the signal beam from the second lens component 27 and the signal beam from the second lens component 29 are different from each other, thus the two signal beams are combined by the first filter 31. For example, the first filter 31 has filter characteristics such that a signal beam having a central wavelength greater (or less) than a certain predetermined value is allowed to transmit the wavelength selection surface, and a signal beam having a central wavelength less (or more) than a certain predetermined value is reflected by the wavelength selection surface.

The second filter 32 is optically coupled to the second lens component 26. The wavelength selection surface of the second filter 32 is located on the optical axis of the second lens component 26, and is oblique to the optical axis. The second filter 32 allows the signal beam from the second lens component 26 to transmit therethrough, and reflects the signal beam from the second lens component 28, reflected by the mirror 33. Thus, the optical path of the signal beam from the second lens component 28 after being reflected by the wavelength selection surface is aligned with the optical path of the signal beam from the second lens component 26 after transmitting through the wavelength selection surface, and these signal beams are combined together. The light reflecting surface of the mirror 33 reflects the signal beam from the second lens component 28 to the second filter 32. Note that whether the signal beam entering the second filter 32 transmits through the wavelength selection surface or is reflected by the wavelength selection surface is determined according to the wavelength of the signal beam. The respective central wavelengths (peak wavelengths) of the signal beam from the second lens component 26 and the signal beam from the second lens component 28 are different from each other, thus the two signal beams are combined by the second filter 32. In this manner, the optical multiplexer 30 generates one wavelength-division multiplexed signal by combining the optical beams having different central wavelengths, output from the N light emitting devices 11 to 14. The polarization combiner 34 is a transmissive plate-like member. The polarization combiner 34 combines the signal beam passing through the first filter 31 and combined, and the signal beam passing through the second filter 32 and combined. The combined signal beam is output to the outside of the housing 2 through a window provided in the front wall parallel to the XY plane of the housing 2.

The optical receptacle 3 is a coaxial module having a lens 36 and a fiber stub (not illustrated). Note that the optical receptacle 3 is illustrated in the YZ cross section in FIG. 1. The lens 36 is optically coupled to the optical multiplexer 30. The fiber stub has a cylindrical shape, and holds an optical fiber as an optical device at a central axis portion. The lens 36 collects the signal beams output from the polarization combiner 34, and guides the beams to the end face of the optical fiber. The optical receptacle 3 is aligned with the optical axis of the beam output from the optical multiplexer 30, for example, then is fixed to the front wall of the housing 2 by welding. The alignment of the optical receptacle 3 is performed so that the optical intensity of the signal beam incident to the optical fiber reaches a maximum value or a predetermined value, for example, by moving the optical receptacle in a direction parallel to the XY plane or in the Z-direction. Consequently, the beams (optical signals) emitted from the N light emitting devices 11 to 14 are combined by the optical multiplexer 30, and are optically coupled to the optical fiber. Note that the optical receptacle 3 may further include an optical isolator that blocks return light from the outside.

Figure 3:
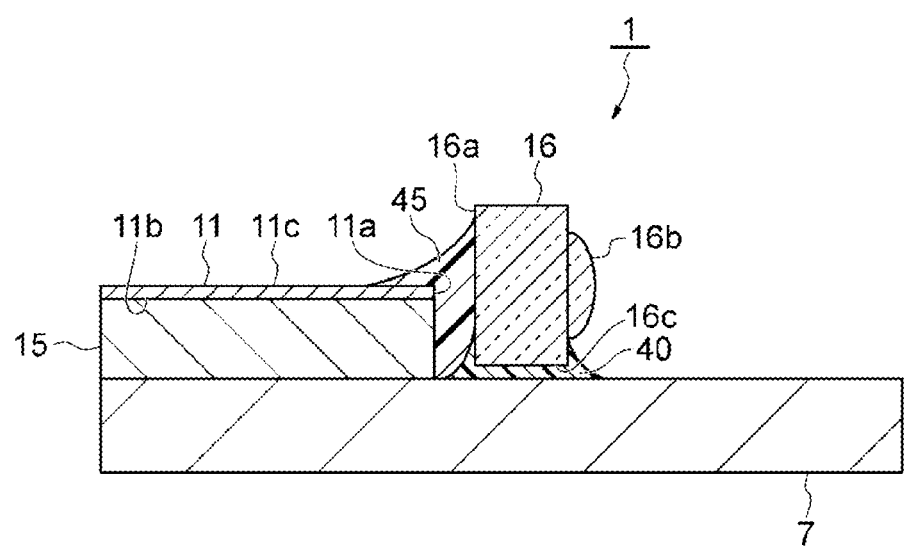
FIG. 3 is a cross-sectional view schematically illustrating an optical coupling system in an optical module illustrated in FIG. 1.

Next, referring to FIG. 3, the optical coupling systems in one-to-one correspondence between the N light emitting devices 11 to 14 and the first lens components 16 to 19 in the optical module 1 will be described in detail. FIG. 3 is a cross-sectional view schematically illustrating an optical coupling system in the optical module 1 illustrated in FIG. 1. Hereinafter, referring to FIG. 3, the optical coupling system between the light emitting device 11 and the first lens component 16 will be described. The optical coupling system between the light emitting device 12 and the first lens component 17, the optical coupling system between the light emitting device 13 and the first lens component 18, and the optical coupling system between the light emitting device 14 and the first lens component 19 are the same as the optical coupling system between the light emitting device 11 and the first lens component 16, and a description is omitted.

As illustrated in FIG. 3, the optical coupling system of the optical module 1 has the base plate 7, the light emitting device 11, the carrier 15, the first lens component 16, a fixing resin 40, and a transmissive resin member 45. The base plate 7 is made of a ceramic material, for example. The base plate 7 includes aluminum nitride (AlN, alumina), for example. The carrier 15 is disposed on the base plate 7. For example, one base plate 7 is prepared in the optical module 1, and is used commonly for the N light emitting devices 11 to 14. The lower surface of the carrier 15 is bonded to the principal surface of the base plate 7. The light emitting device 11 is mounted on the principal surface of the carrier. The principal surface of the carrier is opposite to the lower surface of the carrier. One carrier 15 may be prepared for each of the N light emitting devices 11 to 14, or one carrier 15 may be prepared and used commonly for the N light emitting devices 11 to 14. The base plate 7, the carrier 15, and the light emitting device 11 are stacked in the Y-direction, and formed.

Figure 6A:
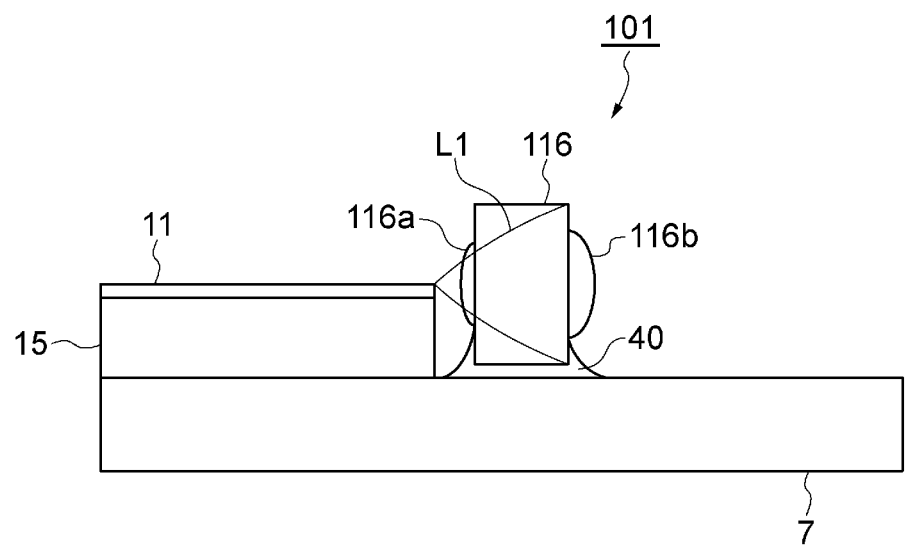
FIG. 6A is a cross-sectional view schematically illustrating an optical coupling system according to a comparative example.
Figure 6B:
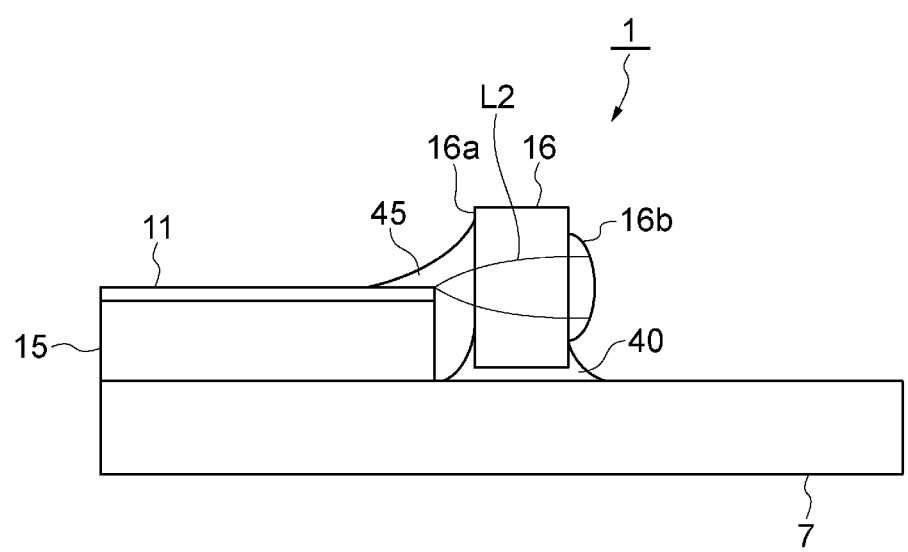
FIG. 6B is a cross-sectional view schematically illustrating an optical coupling system according to the embodiment.

The light emitting device 11 has an end face 11a (incoming and outgoing face), and emits a signal beam (outgoing beam) from the end face 11a to the first lens component 16 (see FIG. 6B which illustrates by an optical path L2 the manner in which a signal beam propagates while spreading). The light emitting device 11 is mounted on the carrier 15 so that the central axis of the first lens component 16 is aligned with the optical axis of the signal beam (outgoing beam) emitted from the light emitting device 11. The light emitting device 11 is an optical modulator chip including a single semiconductor laser, for example. Note that the light emitting device 11 may include only a semiconductor laser diode. The light emitting device 11 is a single end face light emitting semiconductor laser, for example.

The first lens component 16 is a lens to convert the signal beam emitted from the light emitting device 11 to collimated light, for example. The first lens component 16 includes a first lens surface 16a and a second lens surface 16b. The first lens component 16 is a single optical lens, for example. The first lens surface 16a faces the light emitting device 11, and is a planar lens surface, as an example. The second lens surface 16b faces the second lens component 26, and is optically coupled to the second lens component 26 through the optical component 35. For example, the signal beam emitted from the light emitting device 11 enters the first lens surface 16a. For example, the second lens surface 16b emits collimated light to the second lens component 26. The second lens surface 16b is a convex lens surface as an example. The first lens component 16 further has a bottom surface 16c. The bottom surface 16c is parallel to the optical axis of the first lens component 16, and is parallel to the surface of the base plate 7. The first lens component 16 is fixed to the principal surface of the base plate 7 by the fixing resin 40. The first lens surface 16a is coated with the later-described transmissive resin member 45. When the distance between the light emitting device 11 and the first lens component 16 is relatively short, and the first lens surface 16a is a convex lens surface, the light emitting device 11 and the first lens component 16 has a narrow space therebetween, and pores (air bubbles) or a gap may occur in the transmissive resin member 45 which is to be filled in the space. Therefore, it is preferable that the first lens surface 16a be a planar lens surface.

In addition, the first lens component 16 is made of high refractive index glass, for example, TaF3 (refractive index n=approximately 1.8) or silicon (Si) lens having a higher refractive index (refractive index n=approximately 3.2). The refractive index of the first lens component 16 is preferably higher than the refractive index of the transmissive resin member 45 in a cured state provided between the light emitting device 11 and the first lens component 16, and is 1.6 or higher, for example. The refractive indexes of the first lens component 16 may be 3.0 or higher. For example, the first lens component 16 may be an Si lens with a refractive index n of 3.4. Note that the refractive index depends on the temperature of the material and the wavelength of light transmitting through the material. The above-mentioned relationship between refractive indices is determined in consideration of the central wavelength of an optical beam assumed and the temperature range in which the optical module 1 is used.

The fixing resin 40 is an adhesive resin to fix the first lens component 16 to the principal surface of the base plate 7. The fixing resin 40 is a light curing resin or a thermosetting resin, for example. The fixing resin 40 fixes the first lens component 16 onto the base plate 7 so that the optical axis of the optical beam emitted from the end face 11a of the light emitting device 11 matches the central axis of the first lens surface 16a of the first lens component 16. Note that the central axis of the first lens surface 16a is aligned with the central axis of the second lens surface 16b, and due to the fixation of the first lens component 16 to the principal surface of the base plate 7 by the fixing resin 40, the optical axis of the signal beam emitted from the light emitting device 11 is also aligned with the central axis of the second lens surface 16b. Note that the central axis of the first lens surface 16a and the central axis of the second lens surface 16b may be referred to as the optical axis of the first lens component 16. More specifically, for example, with the first lens component 16 being held by sucking the upper surface thereof with a suction collet, a gel-like fixing resin is applied between the bottom surface of the first lens component 16 and the principal surface of the base plate 7, and the first lens component 16 is moved relative to the light emitting device 11 in the optical axis direction (Z-direction) and a direction (X-direction and Y-direction) perpendicular to the optical axis so that the optical axis of the optical beam emitted from the light emitting device 11 is aligned with the central axis of the first lens surface 16a of the first lens component 16. Thus, the first lens component 16 is held at the optimal position relative to the light emitting device 11. The gel-like fixing resin before being cured is easily deformable, thus does not prevent the first lens component 16 from moving. With the first lens component 16 being held, the fixing resin 40 is cured by light (ultraviolet ray) irradiation and/or heating (thermal curing), and the first lens component 16 is fixed. The details of a method of assembling an optical coupling system will be described later.

The transmissive resin member 45 is disposed in the space between the light emitting device 11, the carrier 15, and the first lens component 16. The transmissive resin member 45 allows light to transmit therethrough, the light having a wavelength of 1.26 μm or more and 1.63 μm or less, for example. The transmissivity is, for example, 70% or more, and more preferably, 90% or more. Note that the temperature then is determined in a temperature range in which the optical module 1 is used. The transmissive resin member 45 preferably has a light curing property which causes curing by light such as UV light, and a thermosetting property which causes hardening by thermal curing. The transmissive resin member 45 is a silicone resin as an example. Due to the light curing property, after the space being filled with the gel-like transmissive resin at the time of assembling an optical coupling system, the gel-like transmissive resin is prevented from moving to the second lens surface 16b of the first lens component 16. Note that the transmissive resin member 45 is a hardened material obtained by curing such a gel-like transmissive resin.

The refractive index of the transmissive resin member 45 may be 1.1 or higher, or more specifically, may be 1.3 or higher and 1.6 or lower. Since the refractive index of the transmissive resin member 45 is higher than the refractive index (approximately 1.0) of air, the spread angle of the light emitting device 11 can be reduced by decreasing the effective numerical aperture (NA) at the end face 11a of the optical waveguide of the light emitting device 11. Note that the refractive index of the transmissive resin member 45 may be 1.8 or higher and 2.0 or lower. The central wavelength of the signal beam emitted from the light emitting devices 11 to 14 is 1.26 μm or more and 1.63 μm or less, for example. It is preferable that the refractive index of the transmissive resin member 45 be determined in consideration of the central wavelength of the signal beam strictly. However, when the wavelength dependence is negligible, the value shown for the D line of sodium with a wavelength of 589.3 nm may be used as the refractive index.

As described above, the transmissive resin member 45 is provided so as to contain at least the optical path L2 (see FIG. 6B) of the signal beam emitted from the end face 11a of the light emitting device 11 to the first lens component 16. As an example, the transmissive resin member 45 contains at least a region which spreads radially to the first lens surface 16a with the end face 11a as a starting point between the light emitting device 11 and the first lens component 16, the region having a range of an angle from −15 degrees to +15 degrees with respect to the optical axis of the signal beam emitted from the light emitting device 11.

In addition, the transmissive resin member 45 is also filled in between the carrier 15 on which the light emitting device 11 is mounted and the first lens surface 16a of the first lens component 16. In this case, the transmissive resin member 45 is also in contact with the fixing resin 40. In addition, the transmissive resin member 45 is disposed so as to cover at least part of the surface 11c (the part near the first lens component 16) of the light emitting device 11. The surface 11c of the light emitting device 11 is on the opposite side to a mounting surface 11b of the light emitting device 11. The mounting surface 11b is connected (joined) to the principal surface of the carrier 15. Note that the transmissive resin member 45 covers the entire first lens surface 16a, but preferably does not cover the second lens surface 16b. However, the transmissive resin member 45 may reside between the adjacent first lens component 17 and the first lens component 16 to some extent. Note that when the first lens components 16 to 19 are fixed onto the base plate 7 one by one, for example, the transmissive resin member 45 used for the first lens component 16 may be prevented from spreading to the bottom surface of the adjacent first lens component 17 and affecting fixation of the first lens component 17 by the fixing resin 40. Thus, spread of the transmissive resin member 45 in the direction of arrangement of the lenses of the first lens component 16 may be restrained.

Figure 4:
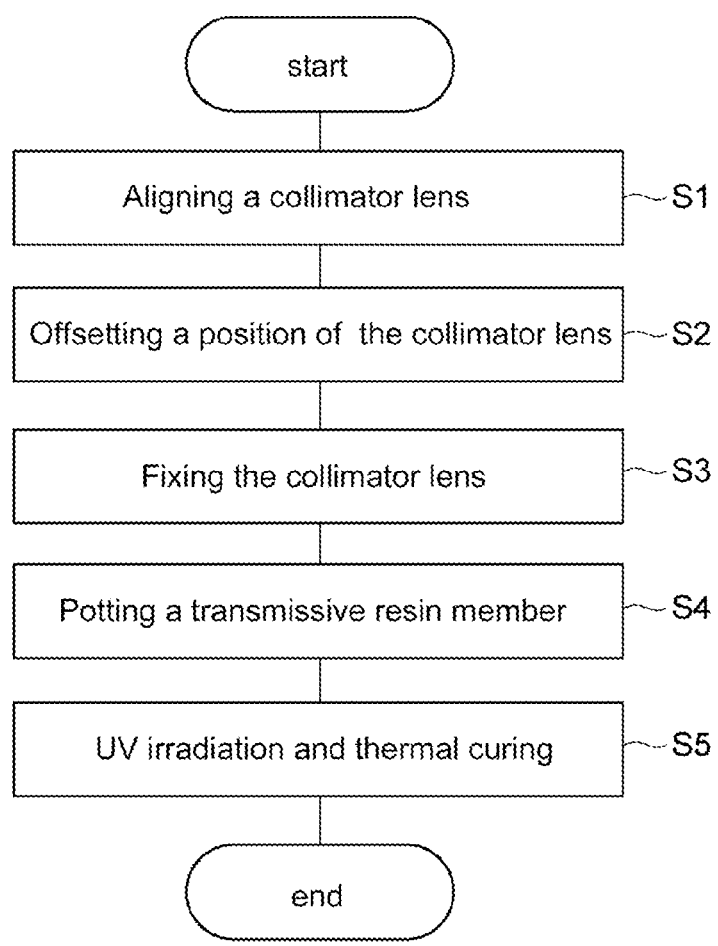
FIG. 4 is a flowchart illustrating a method of assembling the optical coupling system of the optical module illustrated in FIG. 3.
Figure 5A:
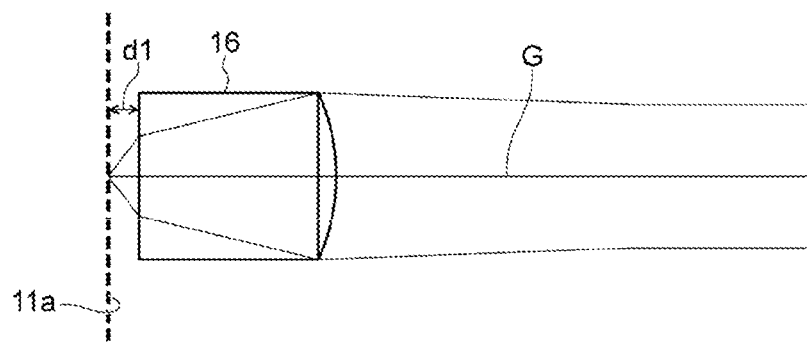
FIG. 5A is a view illustrating an alignment step for an optical lens component.
Figure 5B:
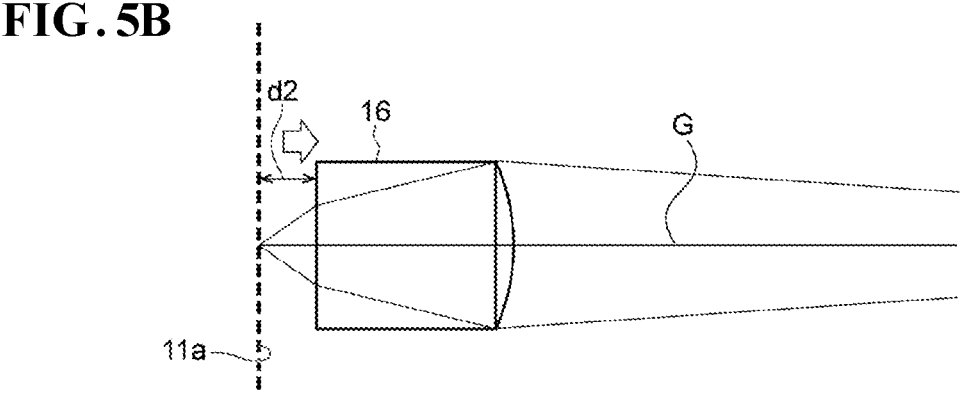
FIG. 5B is a view illustrating an offset step for an optical lens component.
Figure 5C:
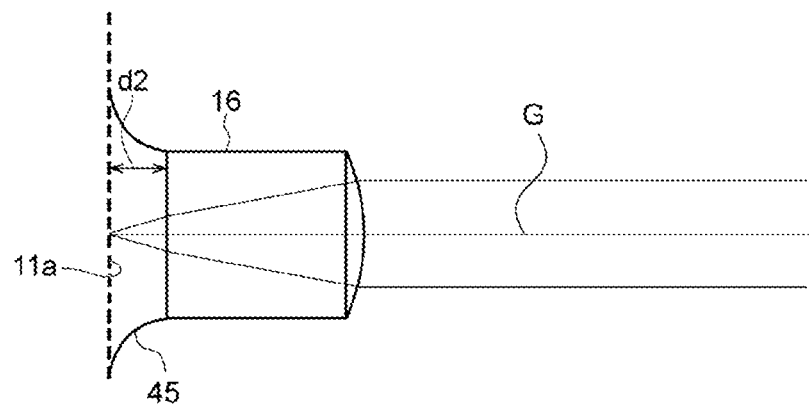
FIG. 5C is a view illustrating a fixation step for an optical lens component.

Next, a method of assembling the optical coupling system of the above-mentioned optical module 1 will be described with reference to FIGS. 4, 5A, 5B, and 5C. FIG. 4 is a flowchart illustrating a method of assembling the optical coupling system of the optical module 1. FIG. 5A is a view illustrating an alignment step for an optical lens component, and FIG. 5B is a view illustrating an offset step for the optical lens component. FIG. 5C is a view illustrating a fixation step for the optical lens component. As the preceding step of the assembly method, first, the light emitting device 11 is disposed on the base plate 7 with the carrier 15 interposed therebetween. The first lens component 16 is held so that the end face 11a of the light emitting device 11 and the first lens surface 16a of the first lens component 16 face each other with a predetermined distance.

Subsequent to the preparation for the preceding step, as illustrated in FIG. 4 and FIG. 5A, active alignment is performed on the first lens component 16 which is a collimator lens (step S1). Specifically, a predetermined bias voltage is applied to the electrodes of the light emitting device 11 which is an optical modulator chip to cause a beam (CW light) to be emitted from the end face 11a of the light emitting device 11. The beam may not be a modulated signal beam, and CW light may be used as the beam. With the beam being emitted, the first lens component 16 is moved along the optical axis G (Z-direction) of the beam, and the beam emitted from the first lens component 16 is received by a light receiving device for alignment at a position away from the first lens component 16. Then, the position of the first lens component 16 is adjusted, for example, to the position where the intensity (optical power) of the received light reaches a maximum value, in other words, the position where the optical coupling efficiency reaches a maximum value. During the alignment, the position of the first lens component 16 may be adjusted so that the beam received and output by the first lens component 16 becomes collimated light.

In step S1, the first lens component 16 is moved by holding the upper surface thereof using a suction collet or the like, for example. In an example, due to the alignment of the collimator lens in step S1, distance d1 between the end face 11a of the light emitting device 11 and the central point of the first lens surface 16a of the first lens component 16 is 80 μm or more and 120 μm or less. Note that in addition to the alignment by movement along the optical axis G, alignment with respect to the XY plane intersecting the optical axis G direction may be performed. Due to the alignment with respect to the XY plane, the optical axis G of the outgoing beam from the light emitting device 11 is aligned with the central axis (optical axis) of the first lens component 16. A detailed description of the alignment with respect to the XY plane is omitted.

Subsequently, as illustrated in FIGS. 4 and 5B, the first lens component 16 is moved by a predetermined distance (offset amount) from the position adjusted in the above-described step S1 in a direction away from the light emitting device 11 along the optical axis G. The operation called the offset (step S2). The focal length of the first lens component 16 is changed depending on the refractive index of the gel-like transmissive resin to be filled in step S4 described below. The offset is processing to compensate the effect of the change in advance. The offset amount is a value determined by the refractive index of the gel-like transmissive resin to be filled and the optical design of the lens. The offset amount is a value which can be defined as appropriate when used. For example, the offset amount increases as the refractive index of the transmissive resin member 45 increases. In an example, when the refractive index of a cured transmissive resin is 1.5, the offset amount may be 70 μm. For example, when the distance d1 between the end face 11a and the first lens surface 16a is 80 μm, the distance d2 after offset illustrated in FIG. 5B is 150 μm. When the first lens component 16 is moved away by the offset amount along the optical axis G from the adjusted position, the beam output from the first lens component 16 changes to converging light from the collimated light.

Subsequently, the first lens component 16 is held at the position after offset, and the first lens component 16 is fixed to the upper surface (principal surface) of the base plate 7 by an adhesive (resin) which is the fixing resin 40. Specifically, with the first lens component 16 being held by a suction collet or the like, an adhesive having a thermosetting property and a UV curing property is introduced between the bottom surface 16c and the upper surface of the base plate 7, and UV irradiation (light irradiation) is performed on the adhesive to temporarily fix the first lens component 16 to the base plate 7. Subsequently, thermal curing is performed to cure an adhesive for fixation, and the first lens component 16 is thereby completely (firmly) fixed to the upper surface of the base plate 7.

Subsequently, as illustrated in FIGS. 4 and 5C, the transmissive resin member 45 such as a gel-like silicone resin is filled between the light emitting device 11, the carrier 15, and the first lens component 16 using a dispenser or the like (step S4). As described above, the transmissive resin member 45 to be filled is a gel-like transparent resin which, for example, when cured, allows light with a wavelength of 1.26 μm or more and 1.63 μm or less to transmit with a transmissivity of 70% or more, and has a thermosetting property and a UV curing property. When the transmissive resin member 45 is filled in step S4, it is potted from a position in contact with the fixing resin 40 on the lower end side to a position to cover part on the upper surface of the light emitting device 11 on the upper end side. In other words, to prevent vignetting caused by spread of the signal beam emitted from the light emitting device 11 to the outside of an effective range of the first lens component 16, a sufficient amount of the transmissive resin member 45 is filled in the space between the light emitting device 11 and the first lens component 16 so that substantially the entire signal beam enters the effective range (effective diameter) of the lens. Providing a specific location with the resin in this manner is called potting. Potting also refers to a state in which a resin is filled. Note that a resin material having a relatively low viscosity may be used as the transmissive resin member 45 so that no pores (air bubbles) and no gap occurs when the transmissive resin member 45 is filled in the space between the light emitting device 11 and the first lens component 16. Meanwhile, for example, when the light emitting device 11 is an optical modulator chip, reduction in the core diameter of the optical waveguide of the optical modulator chip causes increase in the numerical aperture (NA) at the emission end. When the NA is large, the optical path of the beam (signal beam) emitted from the end face of the optical modulator chip may spread during traveling to the collimator lens (the first lens component), and part of the beam may deviate outwardly from the effective range (effective diameter) of the lens. This phenomenon is called vignetting. Because of the vignetting, loss of optical power of, for example, 2 to 3 dB or higher may occur during a time interval until the beam emitted from the optical modulator chip enters an optical device such as an optical fiber. Due to the vignetting, insertion loss of the optical modulator chip may increase.

Subsequently, the transmissive resin member 45 is irradiated with UV to temporarily fix the first lens component 16. Subsequently, the transmissive resin member 45 is further cured by performing thermal curing (step S5). Thus, assembly of the optical coupling system illustrated in FIG. 3 is completed. After the first lens component 16 is fixed and the transmissive resin member 45 is cured, the beam output from the first lens component 16 becomes collimated light again. A diameter of the collimated light after the thermal curing (FIG. 5C) is smaller than a diameter of the collimated light when the first lens component 16 is set at the adjusted position (FIG. 5A). Such reduction of the diameter may be an advantage for preventing the vignetting described above. Note that the optical coupling system between the light emitting device 12 and the first lens component 17, the optical coupling system between the light emitting device 13 and the first lens component 18, and the optical coupling system between the light emitting device 14 and the first lens component 19 are also assembled by the same method. Subsequently, other optical components are installed on the base plate 7, and mounted on the housing 2, thus the optical module 1 illustrated in FIG. 1 is produced.

Figures 7A, 7B:
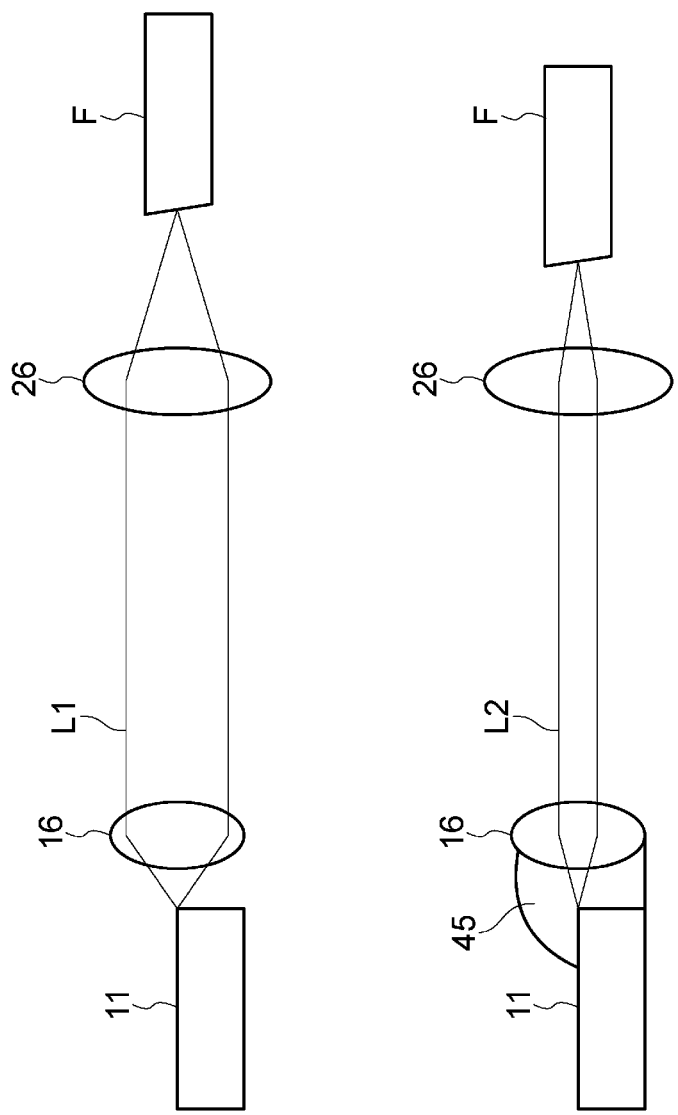
FIG. 7A is a view illustrating the optical path of a beam when an optical modulator chip and an optical fiber are optically coupled using the optical coupling system according to the comparative example illustrated in FIG. 6A.
FIG. 7B is a view illustrating the optical path of a beam when an optical modulator chip and an optical fiber are optically coupled using the optical coupling system according to the embodiment illustrated in FIG. 6B.
Figure 9A:
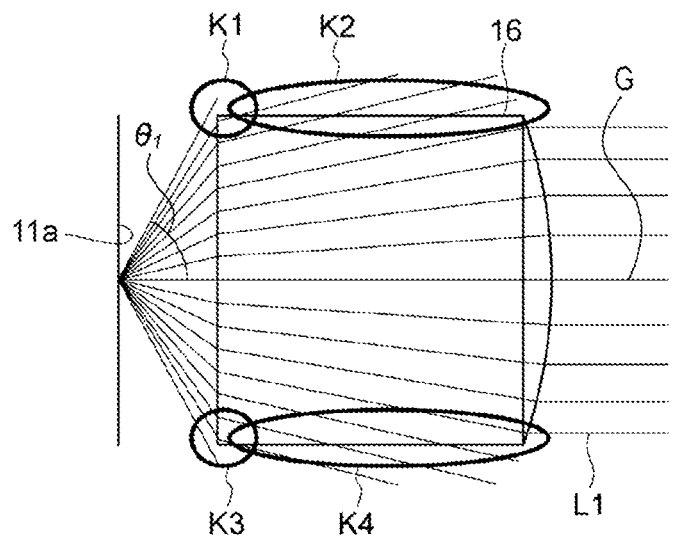
FIG. 9A is a view illustrating the spread of the optical path of a beam in the optical coupling system according to a comparative example illustrated in FIG. 6A.
Figure 9B:
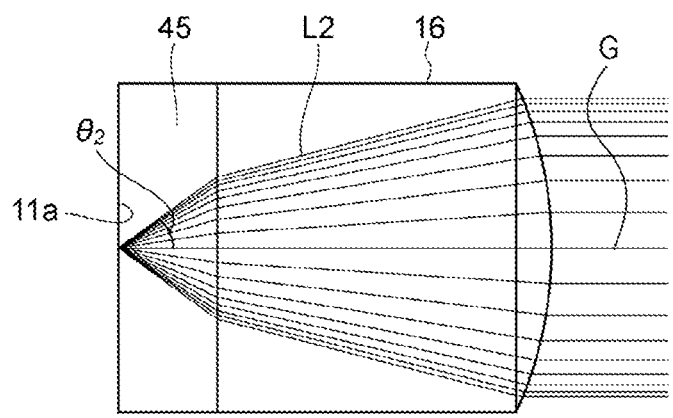
FIG. 9B is a view illustrating the spread of the optical path of a beam in the optical coupling system according to the embodiment illustrated in FIG. 6B.

Here, the functional effect of the optical coupling system of the optical module 1 having the above-described configuration will be described in detail in comparison with an optical coupling structure according to a comparative example. FIG. 6A is a cross-sectional view schematically illustrating an optical coupling system according to a comparative example, and FIG. 6B is a cross-sectional view schematically illustrating the optical coupling system illustrated in FIG. 3. The cross sections in these cross-sectional views are parallel to the YZ plane, and FIGS. 6A and 6B illustrate how the cross sections are seen in the X-direction. FIG. 7A is a view illustrating the optical path of a beam when an optical modulator chip and an optical fiber are optically coupled using the optical coupling system according to the comparative example illustrated in FIG. 6A. FIG. 7B is a view illustrating the optical path of a beam when an optical modulator chip and an optical fiber are optically coupled using the optical coupling system according to the embodiment illustrated in FIG. 6B. FIGS. 7A and 7B each illustrate how the views are seen in the X-direction. In FIGS. 7A and 7B, the shape of the first lens components 116, 16 is illustrated in a simplified form. FIG. 8A is a view illustrating the spread of the optical path in a vertical direction (Y-direction) in the optical module including the optical coupling system according to the comparative example illustrated in FIG. 6A. FIG. 8B is a view illustrating the spread of the optical path in a lateral direction (X-direction) in the optical module including the optical coupling system according to the comparative example illustrated in FIG. 6A. FIG. 8A illustrates how the optical coupling system illustrated in FIG. 6B is seen in the X-direction, and FIG. 8B illustrates how the optical coupling system illustrated in FIG. 6B is seen in the Y-direction. FIG. 9A is a view illustrating the spread of the optical path of a beam in a vertical direction in the optical coupling system according to the comparative example illustrated in FIG. 6A. Note that in FIG. 9A, the first lens component illustrated in FIG. 6A is assumed to be the same as the first lens component 16 according to the embodiment, and a configuration is shown in which the transmissive resin member 45 is not provided between the end face 11a of the light emitting device 11 and the first lens component 11. FIG. 9B is a view illustrating the spread of the optical path in a vertical direction of the optical coupling system according to the embodiment illustrated in FIG. 6B. FIGS. 9A and 9B each illustrate how the view is seen in the X-direction. Hereinafter, the functional effect of the optical coupling system between the light emitting device 11 and the first lens component 16 will be described as an example, and the same description goes for the functional effect of the optical coupling system between the light emitting device 12 and the first lens component 17, the optical coupling system between the light emitting device 13 and the first lens component 18, and the optical coupling system between the light emitting device 14 and the first lens component 19.

As illustrated in FIG. 6A, the optical coupling system of an optical module 101 of the comparative example includes the base plate 7, the light emitting device 11 which is an optical modulator chip, the carrier 15, the fixing resin 40, and a first lens component 116. The first lens component 116 includes a first lens surface 116a facing the light emitting device 11, and a second lens surface 116b on the opposite side to the first lens surface 116a. The first lens surface 116a and the second lens surface 116b are both convex lenses. The shape of each lens surface may be spherical or aspherical. Note that in the optical coupling system of the comparative example, the space between the light emitting device 11 and the first lens component 116 is not provided with the transmissive resin member 45, and is hollow.

As illustrated in FIGS. 6A and 7A, in the optical module 101 and its optical coupling system according to the comparative example, an optical path L1 of the signal beam spreads, which is emitted from the end face 11a of the light emitting device 11 to the first lens component 116 (collimator lens). This is due to the following reason. For example, when the core diameter (MFD) of the optical waveguide of the light emitting device 11 is 1.0 µm, the numerical aperture NAx in the planar direction (direction parallel to the principal surface) of the base plate 7 is 0.35, thus the optical path L1 of the signal beam from the end face 11a does not spread much (for the numerical aperture NAx, the same value as in the embodiment is assumed in the comparative example, see FIG. 8B). In contrast, the numerical aperture NAy in a direction (vertical direction) perpendicular to the base plate 7 is 0.79, thus the optical path L1 of the signal beam spreads, which is emitted from the end face 11a of the light emitting device 11 (for the numerical aperture NAy, the same value as in the embodiment is assumed in the comparative example, see FIG. 8A). Therefore, the spread angle ($1/e^2$) of the signal beam emitted from the end face 11a in a direction perpendicular to the base plate 7 is approximately 45 degrees. In this case, for example, as illustrated in FIG. 9A, a phenomenon occurs in which part of the signal beam, that is, K1, K2, K3 and K4 do not enter an area with an effective diameter of the first lens component 16, and loss of optical power occurs due to vignetting. More specifically, in FIG. 9A, an angle $\theta_1$ corresponds to the spread angle for the optical axis G in a vertical direction (Y-direction). The relationship between the spread angle $\theta_1$ and a numerical aperture NAy of the light emitting device 11 in the vertical direction is expressed as an equation $\theta_1 = \sin^{-1}$ (NAy). In FIG. 9B, an angle $\theta_2$ corresponds to the spread angle for the optical axis G in the vertical direction (Y-direction) when the transmissive resin member 45 is filled in between the light emitting device 11 and the first lens component 16. The relationship between the spread angle $\theta_2$ and a numerical aperture NAy of the light emitting device 11 in the vertical direction is expressed as an equation $02 = \sin^{-1}$ (NAy/n), where n is a specific refractive index of the transmissive resin member 45. For example, when the numerical aperture NAy is 0.5 and the specific refractive index n is 1.5, the spread angle $\theta_1$ becomes 30 degrees and the spread angle $\theta_2$ becomes 19.5 degrees, which is smaller than the spread angle $\theta_1$. Therefore, the potting may have an effect equivalent of reducing the numerical aperture NAy to 0.33 from 0.5. As a consequence, the optical coupling efficiency between an optical device, such as an optical fiber, mounted on the optical module from the outside, and the light emitting device 11 is reduced. It is preferable to reduce the loss of signal and increase the optical coupling efficiency of the optical coupling system as the performance of the optical modules 1, 101.

In contrast, in the optical coupling system according to the embodiment, the transmissive resin member 45 is provided between the end face 11a of the light emitting device 11 and the first lens component 16. The transmissive resin member 45 contains at least the optical path L2 of the signal beam from the light emitting device 11 between the end face 11a of the light emitting device 11 and the first lens surface 16a of the first lens component 16. In this manner, a hollow space in related art is provided with the transmissive resin member 45, thus the vertical spread of the signal beam emitted from the end face 11a of the light emitting device 11 is controlled, and loss of optical power due to vignetting can be reduced. Specifically, the most outgoing beam from the light emitting device 11 enters the effective range (effective diameter) of the first lens component 16, thus it is possible to increase the optical coupling efficiency between the first lens component 16 and the optical fiber which is an optical device. In other words, the optical coupling system according to the embodiment can reduce the ratio of outward beam to the signal beam emitted from the light emitting device 11, the outward beam deviating outwardly from the effective range (effective diameter) of the first lens component 16.

More specifically, in the embodiment, as the transmissive resin member 45, a silicone resin is used, which has a refractive index in a cured state of 1.3 or higher and 1.6 or lower (for example, approximately 1.5), which is higher than the refractive index of the air. Note that the refractive index depends on the temperature of the material and the wavelength of light transmitting through the resin. The refractive index in a cured state is determined in consideration of the central wavelength of the optical signal emitted from the light emitting device and the temperature range in which the optical module 1 is used. The silicone resin is provided to come into contact with and cover the end face 11a of the light emitting device 11, that is, the end of the optical waveguide, thus the spread angle of the beam (signal beam) emitted from the light emitting device 11 can be reduced to 27.8 degrees which is given by $\sin^{-1}$ (NA/1.5). This is because the effective numerical aperture at the end face 11a of the light emitting device 11 is given by NA/n, where NA is the numerical aperture on the side of the light emitting device 11 when the signal beam emitted from the light emitting device 11 propagates to the first lens component 16 in the air, and n is the refractive index of the transmissive resin member 45 in a cured state. Specifically, the numerical aperture NAy of 0.79 in a direction (Y-direction) perpendicular to the base plate 7 can be reduced to 0.467 which is the effective numerical aperture NAy obtained by potting of the transmissive resin member 45. Consequently, as illustrated in FIGS. 6B, 7B, 8A, and 9B, in the optical coupling system according to the embodiment, as compared with when a hollow space is used, the spread of the optical path L2 of the signal beam emitted from the light emitting device 11 can be reduced, and vignetting can be prevented. Consequently, it is possible to cause substantially the entire beam emitted from the light emitting device 11 to enter the collimator lens serving as the first lens component 16, and to increase the optical coupling efficiency. In other words, as compared with when a hollow space is used, an outward beam of the signal beam emitted from the light emitting device 11 can be reduced, the outward beam deviating outwardly from the effective range of the first lens component 16. Note that in the optical coupling system according to the embodiment, the numerical aperture NA in the planar direction (X direction) of the base plate 7 is reduced at the same rate as the numerical aperture NA in the direction (Y direction) perpendicular to the base plate 7, thus the beam shape of the signal beam emitted from the light emitting device 11 is maintained. The beam shape refers to the shape of a beam in a cross section perpendicular to the optical axis direction. For example, when the optical axis direction is the Z-direction, the beam shape refers to the shape in a cross section parallel to the XY plane.

As described above, the optical module 1 according to the embodiment is configured such that the transmissive resin member 45 is disposed between the light emitting device 11 and the first lens component 16, and contains at least the optical path L2 of the optical beam emitted from the light emitting device 11 between the end face 11a of the light emitting device 11 and the first lens surface 16a of the first lens component 16. In this manner, a hollow space in related art is provided with the transmissive resin member 45, thus the spread of the signal beam emitted from the end face 11a of the light emitting device 11 is controlled, and loss of the optical power of the optical beam due to vignetting can be reduced as compared with when a hollow space is used. That is, substantially the entire signal beam emitted from the light emitting device 11 enters the effective range (effective diameter) of the first lens component 16, and the optical coupling efficiency with the optical device through the first lens component 16 can be increased. In other words, as compared with when a hollow space is used, the ratio of outward beam to the signal beam emitted from the light emitting device 11 can be reduced, the outward beam deviating outwardly from the effective range (effective diameter) of the first lens component 16. According to the embodiment, the spread of the beam emitted from the light emitting device 11 can be controlled, thus miniaturization of the optical lens component and miniaturization of the optical module can be achieved, for example, by reducing the length (height) of the optical lens component in a direction perpendicular to the principal surface of the base plate 7.

In the embodiment, the refractive index of the first lens component 16 is higher than the refractive index of the transmissive resin member 45 in a cured state. When the refractive index of the first lens component 16 is lower than the refractive index of the transmissive resin member 45 in a cured state, the function as the lens cannot be sufficiently achieved. However, with this configuration, the function as the optical lens component can be achieved more reliably.

In the embodiment, the refractive index of the first lens component 16 may be higher than 3. When the difference between the refractive indices of the first lens components 16 to 19 and the adjacent transmissive resin member 45 is reduced, the function of the optical lens component may decrease. However, with the present configuration, the difference between the refractive index of the optical lens component and the refractive index of the transmissive resin in a cured state can be increased, and the function as the optical lens component can be achieved more reliably.

In the embodiment, the refractive index of the transmissive resin member 45 in a cured state is higher than 1.1. When the space between the end face of the light emitting device 11 and the first lens component 16 is occupied by air (refractive index n is 1.000292), the optical path of the beam emitted from the end face of the light emitting device 11 tends to spread. However, the spread of the beam emitted from the light emitting device can be made lower than the spread when a hollow space is used by increasing the refractive index of the transmissive resin member 45 in a cured state to a level higher than 1.1. The refractive index of the transmissive resin member 45 in a cured state may be 1.3 or higher and 1.6 or lower. Alternatively, the transmissive resin member 45 may be a silicone resin. A silicone resin is suitable in respect to transmissive property and refractive index, and is able to increase the degree of practicality.

In the embodiment, the transmissive resin member 45 in a cured state allows light with a wavelength of 1.26 μm or more and 1.63 μm or less to transmit therethrough with a transmissivity of 70% or more, more preferably 90% or more. Consequently, as compared with when the space between the end face of the light emitting device 11 and the first lens component 16 is hollow, it is possible to reduce the optical coupling loss of the signal beam emitted from the light emitting device due to the transmissive resin member 45.

In the embodiment, the transmissive resin member 45 contains at least a region which spreads radially to the first lens surface with the end face of the light emitting device 11 as a starting point between the light emitting device 11 and the first lens component 16, the region having a range of an angle from −15 degrees to +15 degrees with respect to the optical axis of the light emitting device 11. With this configuration, the optical coupling efficiency can be increased by containing the optical path of the signal beam emitted from the light emitting device 11 in the region. In addition, vignetting can be reduced by decreasing the ratio of outward beam to the signal beam emitted from the light emitting device 11 to a level lower than the ratio when a hollow space is used, the outward beam deviating outwardly from the effective range of the first lens surface.

In the embodiment, the transmissive resin member 45 is filled in the area between the carrier 15 and the first lens component 16, and covers at least part of the surface 11c which is on the opposite side of the light emitting device 11 from the mounting surface 11b in contact with the carrier 15, and which spreads in a direction intersecting the end face 11a. With this configuration, the transmissive resin member 45 in a cured state disposed between the end face 11a of the light emitting device 11 and the first lens surface 16a of the first lens component 16 can be reliably maintained against a long-term change in the environmental temperature. Consequently, the optical module 1 can be implemented, which maintains a high optical coupling efficiency for a long time.

In the embodiment, the light emitting device 11 is disposed on the carrier 15 so that the central axis of the first lens component 16 is aligned with the optical axis of the beam emitted from the light emitting device 11. With this configuration, the optical coupling efficiency between the light emitting device 11 and the optical device such as an optical fiber can be further increased via the first lens component 16.

In the above, the details of the functional effect of the optical coupling system between the light emitting device 11 and the first lens component 16 has been described variously as an example. However, it is apparent for those skilled in the art that the same functional effect is obtained for the optical coupling system between the light emitting device 12 and the first lens component 17, the optical coupling system between the light emitting device 13 and the first lens component 18, and the optical coupling system between the light emitting device 14 and the first lens component 19. Thus, a description is omitted.

Although the embodiment of the present disclosure has been described in detail in the above, the present disclosure is not limited to the embodiment and is applicable to various embodiments. For example, in the embodiment described above, a configuration has been shown in which the optical module 1 includes a plurality of light emitting devices. However, the number of light emitting devices is not limited to plural, and the optical module may include one light emitting device as an optical semiconductor device having an optical waveguide. Alternatively, the optical semiconductor device may be a light emitting device (LD) including an optical waveguide which is not a modulator, a light receiving device (PD) including an optical waveguide, or a multi-mode interference (MMI) chip.

When the optical semiconductor device is a light receiving device, a signal beam incident to the first lens component from the outside enters a light receiving surface (incoming and outgoing face) of the light receiving device serving as the optical semiconductor device through the transmissive resin member 45. Note that the light receiving device is fixed to the carrier 15 so that the light receiving surface of the light receiving device is substantially perpendicular to the optical axis of the signal beam (incident beam) entering from the first lens component, for example. For example, the light receiving device is fixed to the side surface of the carrier of the first lens component so that the light receiving surface faces the first lens surface. In this case, similarly to what has been described above, due to the transmissive resin member 45, the signal beam (incident beam) can be reliably focused on the light receiving surface of the light receiving device by the first lens components 16 to 19. In the method of assembling the optical coupling system including a light receiving device, in the active alignment in step S1 illustrated in FIG. 4, the first lens component 16 is moved along the optical axis (Z-direction) of the light receiving device while allowing a signal beam from an optical fiber to enter the light receiving surface of the light receiving device through the first lens component 16, the optical fiber being an external optical device. Then, the position of the first lens component 16 is adjusted, for example, to the position where the optical power received by the light receiving device reaches a maximum value, in other words, the position where the optical coupling efficiency reaches a maximum value. Other steps (such as an offset step) are the same as in the above-described method of assembling an optical coupling system including a light receiving device.

What is claimed is:

1. An optical module comprising:
   a base plate having a first principal surface;
   a carrier mounted on the first principal surface of the base plate;
   an optical semiconductor device having an optical end surface and being mounted on the carrier, the optical semiconductor device being configured to emit an outgoing beam from the optical end surface or receive an incoming beam at the optical end surface;
   an optical lens component mounted on the first principal surface of the base plate, the optical lens component having a first lens surface and a second lens surface, the first lens surface facing the optical end surface of the optical semiconductor device, the first lens surface being provided between the optical end surface and the second lens surface in a first direction parallel to the first principal surface of the base plate;
   a transmissive resin member in a cured state, the transmissive resin member being filled between the optical semiconductor device and the first lens surface of the optical lens component; and
   a fixing resin member between a bottom surface of the optical lens component and the first principal surface of the base plate;
   wherein the transmissive resin member contains either an optical path of the outgoing beam or an optical path of the incoming beam between the optical end surface of the optical semiconductor device and the first lens surface of the optical lens component,
   the transmissive resin is in contact with the fixing resin member between the optical semiconductor device and the first lens surface,
   the bottom surface intersects the first lens surface and the second lens surface, and
   the bottom surface is bonded to the first principal surface of the base plate.

2. The optical module according to claim 1,
   wherein a refractive index of the optical lens component is higher than a refractive index of the transmissive resin member in the cured state.

3. The optical module according to claim 2,
   wherein the refractive index of the optical lens component is higher than 3.

4. The optical module according to claim 3,
   wherein the refractive index of the transmissive resin member in the cured state is higher than 1.1.

5. The optical module according to claim 4,
   wherein the refractive index of the transmissive resin member in the cured state is 1.3 or higher and 1.6 or lower.

6. The optical module according to claim 1,
   wherein the transmissive resin member is a silicone resin.

7. The optical module according to claim 1,
   wherein the transmissive resin member in the cured state allows light with a wavelength of 1.26 µm or more and 1.63 µm or less to transmit with a transmissivity of 70% or more.

8. The optical module according to claim 1,
   wherein the transmissive resin member is provided between the optical semiconductor device and the optical lens component, and contains at least a region which spreads radially to the first lens surface with the optical end surface as a starting point in a range of an angle from −15 degrees to +15 degrees with respect to either an optical axis of the outgoing beam or an optical axis of the incoming beam.

9. The optical module according to claim 1,
   wherein the transmissive resin member is filled between the carrier and the optical lens component to come into contact with the carrier and the optical lens component, and covers at least part of a surface of the optical semiconductor device, the surface being opposite to a mounting surface of the optical semiconductor device on the carrier.

10. The optical module according to claim 1,
    wherein the optical lens component has a central axis aligned with either an optical axis of the outgoing beam or an optical axis of the incoming beam.

11. The optical module according to claim 1,
    wherein the carrier has a second principal surface and a lower surface opposite to the second principal surface, the lower surface being bonded to the first principal surface of the base plate, and
    the optical semiconductor device is mounted on the second principal surface of the carrier.

12. A method of producing an optical module including a base plate having a first principal surface; a carrier; an optical semiconductor device having an optical end surface and being configured to emit an outgoing beam from the optical end surface or receive an incoming beam at the optical end surface; and an optical lens component having a first lens surface and a second lens surface, the first lens surface being provided between the optical semiconductor device and the second lens surface in a first direction parallel to the first principal surface of the base plate,
    the method comprising:
    positioning the optical semiconductor device and the optical lens component on the first principal surface so that an optical end surface of the optical semiconductor device disposed on the base plate with the carrier interposed between the optical semiconductor device and the base plate faces the first lens surface of the optical lens component;
    aligning the optical lens component on the first principal surface so that the outgoing beam of the optical semiconductor device becomes collimated light, or an optical coupling efficiency of the outgoing beam reaches a maximum value or a predetermined value, or an optical coupling efficiency of the incoming beam reaches a maximum value or a predetermined value;
    offsetting the optical lens component from a position where the aligning is performed to separate the optical lens component from the optical semiconductor device by an offset amount along either an optical axis of the outgoing beam or an optical axis of the incoming beam;
    fixing the optical lens component on the first principal surface of the base plate with a fixing resin after the offsetting;
    filling a gel-like transmissive resin between the optical lens component on which the offsetting has been performed and the optical semiconductor device, the gel-like transmissive resin allowing at least one of light curing and thermal curing; and curing the gel-like transmissive resin filled between the optical lens component and the optical semiconductor device by performing at least one of the light curing and the thermal curing on the transmissive resin, wherein in the filling, the gel-like transmissive resin is filled so that when the gel-like transmissive resin is cured, the transmissive resin contains either an optical path of the outgoing beam or an optical path of the incoming beam between the optical end surface of the optical semiconductor device and the first lens surface of the optical lens component.

13. The method of producing an optical module according to claim 12, wherein the offset amount is determined based on a refractive index of the gel-like transmissive resin.

14. The method of producing an optical module according to claim 12, wherein the carrier has a second principal surface and a lower surface opposite to the second principal surface, the lower surface facing the first principal surface of the base plate, and the optical semiconductor device is mounted on the second principal surface of the carrier.

15. The method of producing an optical module according to claim 12, wherein the optical lens component has a bottom surface intersecting the first lens surface and the second lens surface, and the bottom surface faces the first principal surface of the base plate.

16. The method of producing an optical module according to claim 12, wherein the positioning the optical semiconductor device and the optical lens component includes:

disposing the carrier on the first principal surface of the base plate, the carrier having a second principal surface, the optical semiconductor device being mounted on the second principal surface.

17. An optical module comprising:

a base plate having a first principal surface;

a carrier mounted on the first principal surface of the base plate;

an optical semiconductor device having an optical end surface and being mounted on the carrier, the optical semiconductor device being configured to emit an outgoing beam from the optical end surface or receive an incoming beam at the optical end surface;

an optical lens component mounted on the first principal surface of the base plate, the optical lens component having a first lens surface and a second lens surface, the first lens surface facing the optical end surface of the optical semiconductor device, the first lens surface being provided between the optical end surface and the second lens surface in a first direction parallel to the first principal surface of the base plate; and a transmissive resin member in a cured state, the transmissive resin member being filled between the optical semiconductor device and the first lens surface of the optical lens component;

wherein the transmissive resin member contains either an optical path of the outgoing beam or an optical path of the incoming beam between the optical end surface of the optical semiconductor device and the first lens surface of the optical lens component, the carrier has a second principal surface and a lower surface opposite to the second principal surface, the lower surface being bonded to the first principal surface of the base plate, and the optical semiconductor device is mounted on the second principal surface of the carrier.

* * * * *